United States Patent [19]
Pannone

[11] Patent Number: 5,623,498
[45] Date of Patent: Apr. 22, 1997

[54] USER PROGRAMMABLE TEST ARRANGEMENT FOR A TELECOMMUNICATIONS NETWORK

[75] Inventor: L. V. Pannone, Manalapan, N.J.

[73] Assignee: Lucent Technologies, Inc., Murray Hill, N.J.

[21] Appl. No.: 414,082

[22] Filed: Mar. 31, 1995

[51] Int. Cl.⁶ .................................................... G06F 11/00
[52] U.S. Cl. ........................... 371/20.1; 375/224; 379/29
[58] Field of Search .................................. 371/20.1, 20.5; 395/182.02; 379/6, 21, 27, 29; 375/345, 220, 222, 224

[56]  References Cited

U.S. PATENT DOCUMENTS 5,105,438  4/1992  Ackroff et al. ......................... 375/224
5,432,705  7/1995  Severt et al. ............................ 364/481
5,473,666  12/1995  Szczebak, Jr. et al. ...................... 379/3

Primary Examiner—Robert W. Beausoliel, Jr.
Assistant Examiner—Phung My Chung
Attorney, Agent, or Firm—Frederick B. Luludis

[57]  ABSTRACT

A telecommunications operation support facility is arranged so that a user may easily build and/or update a program implementing a test strategy for testing a special services circuit without having to consider certain aspects that make the strategy complex. Such aspects include, inter alia, the configuration of the section of the special service circuit that is to be tested and the "vintage" of a remote test system which provides a way of accessing the section from a remote test point.

10 Claims, 4 Drawing Sheets

5,623,498

USER PROGRAMMABLE TEST ARRANGEMENT FOR A TELECOMMUNICATIONS NETWORK

FIELD OF THE INVENTION

The invention relates to the testing of special service circuits provided by an associated telecommunications system.

BACKGROUND OF THE INVENTION

Currently, vendors of telecommunications equipment design, build, test and maintain automated testing strategies (programs) for testing special service circuits. A special services circuit is a class of circuits other than a circuit for providing Plain Old Telephone Service (POTS), and typically uses dedicated equipment and facilities to provide an end to end service to a customer. Also, a special services circuit often requires special (or customized) provisioning and maintenance.

The maintenance (test strategy) of a special services circuit may be very complex and is typically implemented in software that runs on an Operations Support System (OSS), for example, the so-called Switched Access and Remote Testing System (SARTS) available from AT&T Corp. A vendor of a SARTS-like system is usually the entity that develops the requirements of an automated testing strategy that is used to test a particular special services circuit provided by a particular Local Exchange Carrier (LEC). The LEC (i.e., the end customer) usually reviews a test strategy before it is implemented in a SARTS or similar system. However, in spite of the best efforts of a vendor to prepare comprehensive requirements defining a test strategy and customer review thereof, the requirements may still be imprecise. One reason for this is that the problem solved by the test strategy is often complex. As such, it is not until the software program embodying the test strategy is delivered to the customer and made operational, that such imprecision and other shortcomings become evident. At that point, the test strategy and resulting software program has to be redesigned to address identified deficiencies. It may appreciated that the time consumed to effect a redesign of the software program and expense of doing so is clearly undesirable.

SUMMARY OF THE INVENTION

I have recognized that the foregoing problem may be dealt with by providing a facility which a user of a SARTS like system may employ to easily build and/or update a program implementing a test strategy without having to consider various aspects of the special services circuit that make the strategy complex. Such aspects include, inter alia, the configuration of the section of the special service circuit that is being tested and the vintage of a remote test system which provides a way of accessing the section from a remote test point.

More specifically, a user may design a program which implements a test strategy using what I call generic instructions. When the program is being executed and a generic instruction is encountered, then, in accordance with an aspect of the invention, the instruction is customized on the fly to deal with the particular type of remote test system that is colocated with a section of the circuit that is being tested. In accord with another aspect of the invention, the instruction is further customized on the fly (i.e., in real time) to deal with the configuration of the circuit section.

Other aspects of the invention will be made apparent in the following detailed description.

DETAILED DESCRIPTION

Figure 1:
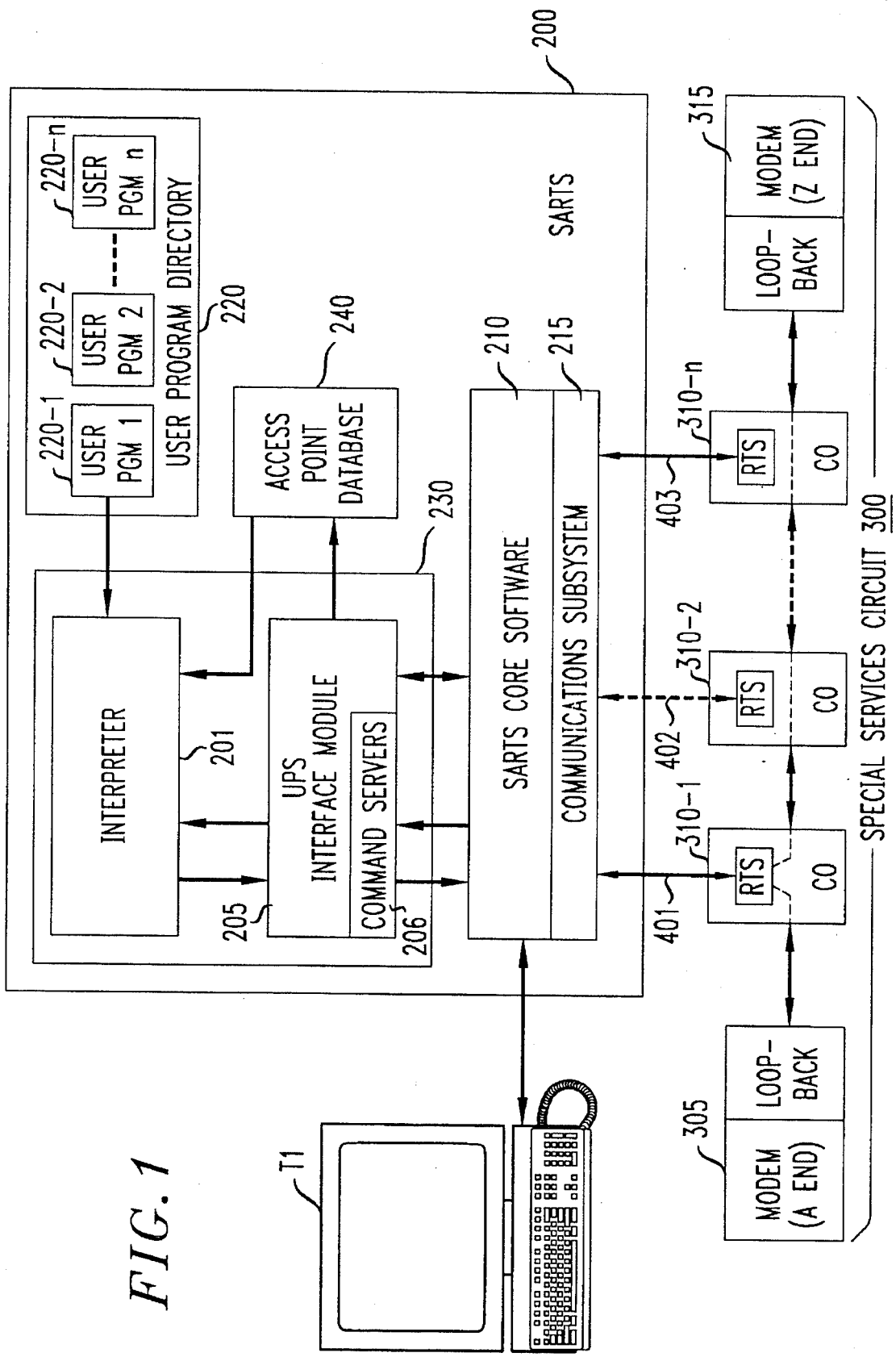
FIG. 1 shows in block diagram an illustrative system in which the principles of the invention may be practiced.

FIG. 1 shows an illustrative system in which the principles of the invention may be practiced. Specifically, system 200 may be a conventional operations support system designed to facilitate the testing of special service circuits. An example of one such operations support system is AT&T's Switched Access Remote Test System (SARTS), which may include core software 210 for controlling the overall operation of the SARTS system 200. The core software 210, more particularly, interfaces with an external special service circuit, e.g. circuit 300, via so-called communications subsystem software, which drives associated hardware, e.g., a data link, such as link 401.

A craftsperson may communicate with SARTS 200 via a conventional data terminal, e.g., terminal T1, for the purpose of testing special service circuit 300. Such testing may be done manually or automatically. In a manual mode, the craftsperson communicates with SARTS 200 via terminal T1 to direct each step of the test procedure and interpret the result of the test. In an automatic mode, the craftsperson causes SARTS 200 to invoke a program designed to (a) automatically test and evaluate predefined operating aspects of an identified special service circuit and (b) evaluate the results of such tests. The predefined aspects may include, for example, transmission tests, metallic tests, signaling test, etc.

It is seen from FIG. 1 that SARTS 200 includes communications subsystem 215, which is used to interface a CORE software 210 (i.e., SARTS operating system software for controlling the operation (running) of associated test software) with particular test points disposed along a special service circuit via respective Remote Test Systems (RTS), such as RTS 310-1 via data link 401. A data link, e.g., link 401, may be either a direct connection or a so-called dial-up connection as represented by the dashed line of link 402. To access a test point, SARTS 200 directs a RTS 310 via a respective link to redirect the path of the special service circuit located thereat into the RTS, as is shown for RTS 310-1. The program for testing circuit 300 may then direct RTS 310-1 to perform different combinations of tests as specified by the user program that the craftsperson invokes. The RTS, e.g., RTS 310-1, in turn, performs each test of a predefined combination of tests and returns the result as each test is completed to SARTS 200 via the associated data link and subsystem 215. When the program has finished testing a particular section (test point) of the special service circuit, it then directs the RTS, e.g., RTS 310-1, to release the connection. The program may then go on to similarly test another test point, e.g., the section of the special service circuit that is accessed via RTS 310-2, as dictated by the particular test program invoked by the craftsperson. In this way, a special service circuit, e.g., circuit 300, may be fully tested from end-to-end.

Figure 2:
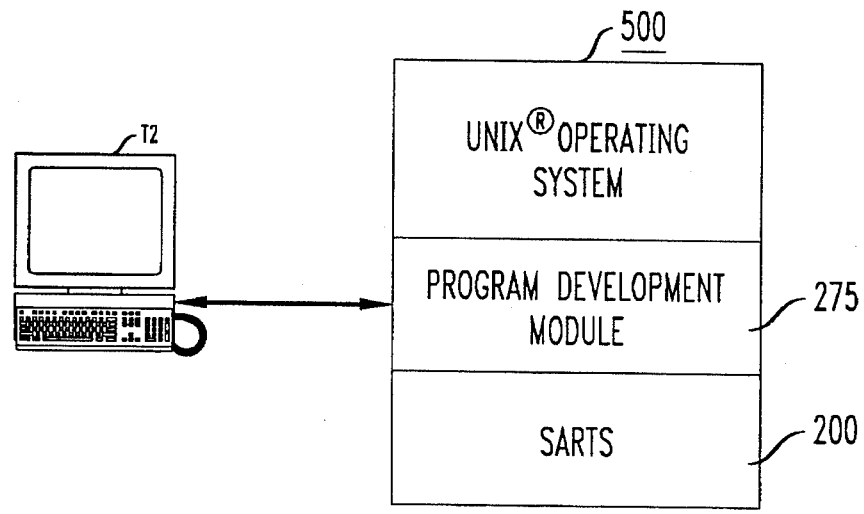
FIG. 2 shows in block diagram form a program development unit that may be used by a user to develop a program to test a particular special service circuit, in which the unit of FIG. 2 incorporates the SARTS system of FIG. 1.
Figure 3:
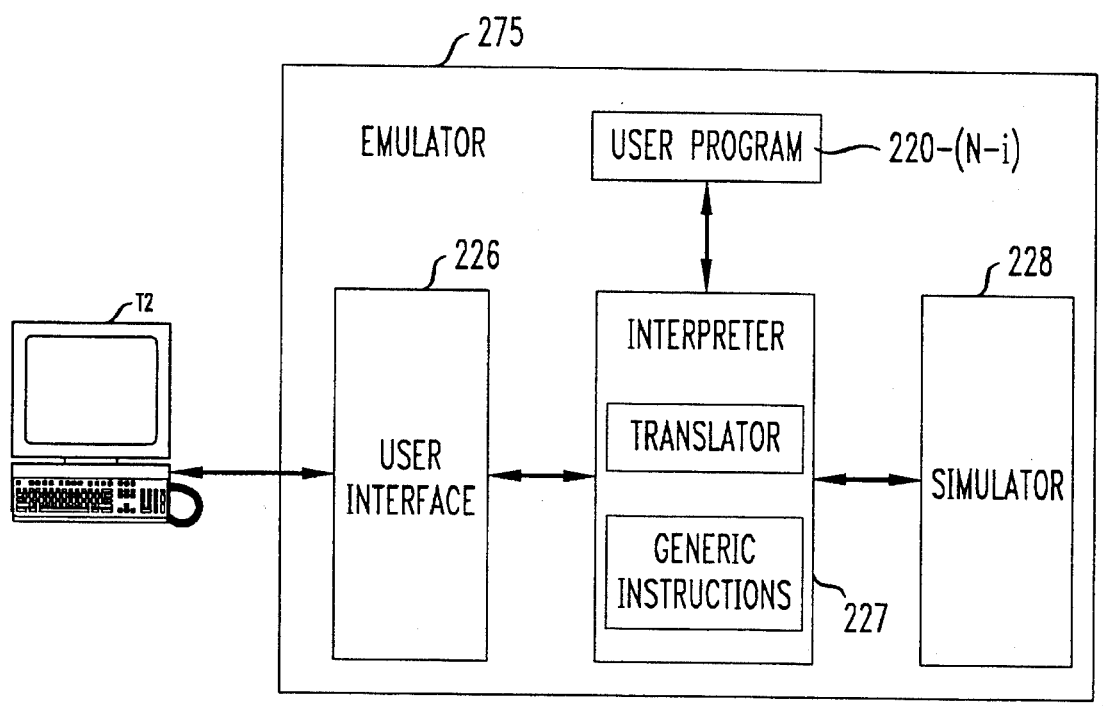
FIG. 3 shows in block diagram form an emulator which may be used to "debug" a user program, in which the emulator of FIG. 3 incorporates the interpreter of FIG. 1.

Heretofore, the aforementioned automated program was typically designed by the vendor of the operations support, e.g., a SARTS-like system, rather than the supplier of the special service circuit, e.g., the Local Exchange Carrier (LEC), such as the LEC having control of Central Offices (CO) 310-1 through 310-N. To deal with this problem, SARTS 200 is associated with a program development module as shown in FIG. 2. The program development module and SARTS 200 run under the UNIX (trademark of UNIX Systems Laboratories Inc.) operating system. More particularly, SARTS 200 and program development module 275 reside on a StarServer FT 200 computer system available from AT&T. It may also reside on a Hewlett Packard Model No. 9800 series computer. (Such computers provide a multitasking environment such that SARTS 200 may run independently of Program Development Module (PDM) 275. (PDM 275 is shown in FIG. 3.))

A user, e.g., a LEC programmer, may design a program to test a particular special service circuit, e.g. circuit 300 (FIG. 1) by communicating with PDM 275 in a conventional manner, i.e., via asynchronous terminal T2. PDM 275, more particularly, provides a programming language which allows a programmer to write a program to test a special service circuit using generic test instructions as well as conventional programming constructs. Such programming constructs include, e.g., if-else statements, looping constructs ("while" or "for" loop), subroutine constructions, etc. Generic instructions (or commands), on the other hand, allow a programmer to specify a testing function using a high-level functional command without having to specify SARTS 200 primitive command(s) and associated parameter(s) for a particular type of RTS, e.g., RTS 310-1 (FIG. 1). That is, it is well-known that there are a number of different generations of Remote Test Systems (RTS) that operate differently—meaning that each RTS responds to different primitive commands to perform the same function, e.g., direct an RTS to apply a test tone to a special service circuit. (It is noted that the words "generation" and "type" are used interchangeably herein.) Accordingly, since a special service circuit might include different generations (types) of RTSs, then a programmer who designed a SARTS user program to test a special circuit needed to know which type(s) of RTS would be involved in the test. As such, the same user program had to be customized to suit the configuration of the particular remote test system.

(It is noted that the different types of remote test systems (RTS) include, for example, models RTS-5A, RMS-D1, and RMS-M available from AT&T Corp.; and the 2238 Remote Test Unit (RTU) available from Tautron a unit of the General Signal Corporation, 9966 RTU available from Wiltron Company and the 3218 RTU available from Hekimian Laboratories Inc.).

This problem is dealt with, in accord with an aspect of the invention, by providing generic test instructions which automatically account for the different types of RTS that may be involved in a test of a particular special service circuit. Accordingly, the same program may be used to test different special service circuits each having a different configuration of remote test systems. Because of this, a program to test a special service circuit is simpler to design—meaning that the programmer does not have to be well-versed in the set of primitive commands that are used for each type of RTS. A user program that is simpler to design thus requires less expertise on the part of the programmer who designs the program. Accordingly, then, such a programmer may interact with PDM 275 via terminal T2 to design a user test program which is stored in a user program directory 220, FIG. 1, after the program has been tested using an associated system emulator.

For example, consider the following program that is designed to access a particular section (test point) along a special service circuit and perform a series of twenty signal level measurements at the A end of the circuit (as shown for modem 305, FIG. 1).

```
acs (1);                    /* access the A end */
split (A_DIR, OFFHK, OFFHK);    /* split the circuit */
/* measure signal in A direction */
for (i = ; i <= 20; i++){
    meas_tone (A_DIR);
    print ("Level = %f, Frequency = %f\n", M_lev, M_freq);
}
``` where the "acs" generic instruction accesses the test point of the circuit being tested, and where the test point is provided as an argument to the "acs" generic instruction. In the example above, test point 1 is requested. The next instruction, "split", splits the circuit, and applies off-hook supervision. The "meas_tone" generic instruction is included in a "for" loop (which is modeled after the well-known C programming language "for" loop instruction), and is repeated 20 times by the "for" loop. Each time the "meas_tone" instruction is executed, it returns level and frequency measurements in variables "M_lev" and "M_freq" respectively. The above user program displays these test results using a formatted print statement, which allows the programmer to precisely control the way in which the results are presented to the craftsperson. (A complete list of the generic instructions is shown in appendix A.)

(It is noted that the above "UPS" programming language allows comments to be included. Accordingly, text between /* and */ is ignored by an associated interpreter, discussed below.)

Once a programmer has designed such a program, he/she may then test the program using an emulator that is provided by PDM 275, as shown in FIG. 3. In particular, user interface 226 includes the well-known C programming language I/O routines, such as the "printf" and "scanf" routines. The "scanf" routine is used to receive instructions from terminal T2 and the "prinf" is used to transmit information to terminal T2 for display thereat. When the programmer invokes a newly-designed user program by invoking a UNIX system shell command from asynchronous terminal T2 to execute emulator 275 then interpreter 227 begins processing the code forming the user program. The design of interpreter 227, more particularly, may be modeled after the interpreter disclosed in the well-known text "*The UNIX Programming Environment*", by B. W. Kernighan et al beginning at page 223, published 1984 by Prentice-Hall, which is hereby incorporated by reference. Interpreter 227 includes conventional built-in functions. It also includes, in accord with an aspect of the invention, "built in" generic instructions, which allow user programs to incorporate the test functionality supported by the generic instructions. Interpreter 227 further includes a translator that converts a generic instruction into one or more primitive test commands.

Interpreter 227, more particularly, processes the user program by executing the program logic specified by the user program. For conventional logic, e.g., a "for loop" the interpreter processes the logic in a well-known manner. However, when the interpreter encounters a particular generic instruction, then it passes control to a routine that is designed to process that type of instruction, as will be discussed below in detail. Besides being designed to operate in the operational mode of FIG. 1 to test a special service circuit, interpreter 227 is also designed to operate in a program development mode of FIG. 3. Moreover, interpreter 227 may be interpreter 201 (FIG. 1).

Stimulator 228 responds to the receipt of a generic instruction, by returning a simulated measurement or test result to the user program, e.g., program 220-(N-i) (FIG. 1). The user program, in turn, may then generate and output a response for display on terminal T2. The interpreter continues executing the user program in this manner until either a program error is encountered or the program has been fully executed.

Once the user's program has been fully tested and "debugged" then the program may be stored in user program directory 220 (FIG. 1). A craftsperson may thereafter invoke the program to test a particular special service circuit, e.g., circuit 300. A craftsperson may do this by entering via terminal T1 a command identifying the special service circuit to be tested and the user program that will be used to conduct the test. The SARTS core software, in response to the command, stores the user's request and the entered identities in a queue associated with User Programmable Subsystem (UPS) interface module 205 (also referred to herein as just UPS 205). UPS 205, as will be discussed below, provides an interface between interpreter 201 and the SARTS core software 210 (also referred to herein as just software 210). UPS 205 in response to the entry being stored in its queue, unloads the entry and then processes it by unloading particular information associated with the identified special service circuit from database 240. Such information includes, inter alia, (a) the number and location of test points along the identified special service circuit, (b) the type (generation) of RTS associated with each test point, and (c) other test information related to each test point. The unloading of the information (data) also makes it available to interpreter 201. UPS 205 then directs interpreter 201 to invoke the identified user program 220. Interpreter 201, in turn, starts the execution of the user program and processes the functions implemented by that program.

When interpreter 201 encounters a generic instruction during such processing, then, in accord with an aspect of the invention, interpreter 201 converts the instruction on the "fly" (i.e., in real time) into one or more primitive test commands customized for the RTS located at the test point that is being tested. For example, a generic instruction, e.g., "meas_tone (A_DIR)"—which causes an RTS to measure the level and frequency of a tone propagating from the A direction to the Z direction—may be converted "on the fly" into the appropriate primitive command(s) of appropriate form based on a number of different factors that are determined by the software routine that processes the generic instruction. Such factors that form the appropriate primitive command(s) include (a) the type of Remote Test Device (RTS) located at the test point undergoing test; (b) the method by which the RTS accesses the test point to be tested, as shown by the dotted line for RTS 310-1 (FIG. 1), which access may be, e.g., metallic access or a so-called bit-stream access via a digital cross connect system (not shown); (c) the configuration of the special service circuit at the test point undergoing test (e.g., 2 wire or 4 wire). In addition, the interpreter 201 software routine processing the generic instruction converts the high level functional parameters specified for the associated instruction into low level options that form a part of the primitive command(s), as discussed below in detail. In addition, generic instructions may implement a "bundling" function to provide a uniform generic interface to the user's program.

Such a "bundling" capability is advantageous in the instance where, for example, two primitive commands are needed to direct a particular RTS to perform a specified function, e.g., signal level and frequency measurements. (It is noted that in another instance, only one primitive command may be needed to direct a different RTS to perform the measurements.) The bundling capability addresses these different instances and thus, in accord with an aspect of the invention, causes one or two primitive instructions to be generated based on the type of RTS that is located at the point being tested. For example, as a result of the bundling capability, the processing of a generic instruction, e.g., the "meas_tone" specified in the above program, determines, "on the fly", whether one or more primitive commands are required to perform the particular function based on the type of remote test system located at the point of the special services circuit being tested. Thus, a generic instruction greatly simplifies the effort and complexity of a user program by eliminating the need for the user to be concerned with such "context sensitive conditions".

Generic instructions will now be discussed in detail using the meas_tone instruction as an example. The generic instruction—"meas_tone", more particularly, is converted into one of the five forms of a so-called SARTS T03 primitive command based on (a) the RTS located at the remote section (test point) of the special service circuit being tested, and (b) the configuration of the test point, e.g. 2-wire or 4-wire. This is illustrated by the following examples of primitive commands shown in general form that may be generated for the meas_tone generic instruction. (It is noted that option fields of the following primitive commands are separated by slashes (/).

| | |
|---|---|
| T03/LEV:FREQ:PAR:PH JTR:LF PH JTR | (1) |
| T03/LEV:FREQ:PAR:PH JTR:LF PH JTR/A:B | (2) |
| T03/E:F | (3) |
| T03/LEV:FREQ:PAR:PH JTR:LF PH JTR:WB PH JTR | (4) |
| T03/LEV:FREQ:PAR:PH JTR:LF PH JTR:WB PH JTR/A:B | (5) | where primitive command 1 (2) is generated for a first type of RTS and for a test point having a two-wire (four-wire) configuration; primitive command (3) is generated for a second type of RTS and primitive command 4 (5) is generated for a third type of RTS and for a test point having a two-wire (four-wire) configuration. In the above example, the processing of the generic instruction, e.g., meas_tone, also (a) determines the more exact form of the above primitive command, (b) selects the primitive command options, and (c) executes the resulting primitive command by sending it via UPS 205 to CORE software 210 (FIG. 1). (It is noted that the first and third types of remote test systems require "bundling". That is, the processing of the generic instruction generates two primitive commands—one with the LEV option, which performs the level measurement, and the other with the FREQ option, which provides the frequency measurement.)

As mentioned above, the processing of the generic instruction also determines whether the section of the special service circuit being tested is a 2 wire or 4 wire test point.

In the latter case, the processing chooses either the A pair or B pair option based on well-known access point assignment rules associated with SARTS system 200. Such rules are disclosed in the publicly available *Bell System Practice* BSP 667-000-001, issue 3, November, 1984, which is hereby incorporated by practice.

As another example, consider a generic instruction that performs a Peak-to-Average (P/AR) transmission measurement, which may be specified as follows:

meas_lbk_par(A_DIR);

The primitive commands that are generated for the P/AR generic instruction, when invoked with the above A_DIR parameter, causes the targeted RTS to transmit a P/AR signal toward the A end of the associated special service circuit and then measure the P/AR of the signal that is returned from the A end via a loopback path that is established for that purpose. The RTS then supplies the resulting measurement to core software 210. Core software 210, in turn, supplies the measurement to interpreter 201 via UPS interface 205, as discussed below.

As shown above, different types of RTSs, however, may not respond to the same primitive commands. That is, one type of RTS uses a single primitive command to apply the P/AR signal and then measure the returning P/AR signal. Other types of RTS require more than one primitive command to perform the same functions. Advantageously, then, the processing of the generic instruction customizes the resulting primitive command(s) to suit the RTS located at the test point, in accord with an aspect of the invention and as discussed above. The primitive commands that are generated responsive to the presence of a P/AR instruction—meas_lbk_par—is discussed below. For a RTS of types 1 and 3, two primitive commands are generated to implement the generic instruction—meas_lbk_par—, one to apply the P/AR signal and one to measure the returning signal. The following are examples of a primitive command that may be used to apply the P/AR signal to a circuit under test:

T08/PAR:NLD:NLD S-N:PH JTR (6)

T08/PAR:NLD:NLD S-N:PH JTR/A:B (7)

where primitive commands (6) and (7) are used to respectively test two and four-wire circuits. For two-wire and four-wire circuits, the T08 primitive command is called with the PAR option. In the four-wire case, the pair (A pair or B pair) option is determined in the manner discussed above for the meas_tone generic instruction.

The following are examples of a primitive command that may be used to measure the returning P/AR signal when the RTS is of a type 1:

T03/LEV:FREQ:PAR:PH JTR:LF PH JTR (8)

T03/LEV:FREQ:PAR:PH JTR:LF PH JTR/A:B (9)

where primitive commands (8) and (9) are used to respectively test two- and four-wire circuits.

The following are examples of a primitive command that may be used to measure the returning P/AR signal when the RTS is of a type 3:

T03/LEV:FREQ:PAR:PH JTR:LF PH JTR:WB PH JTR (10)

T03/LEV:FREQ:PAR:PH JTR:LF PH JTR:WB PH JTR/A:B (11)

where primitive commands (10) and (11) are used to respectively test two-and four-wire circuits. For two-wire and four-wire circuits, the T03 primitive command is called with the PAR option. The A pair or B pair for the four-wire circuit is similarly chosen in the manner discussed above.

Finally, for the type 2 RTS, both the application and measurement of the P/AR signal is accomplished using a single primitive command, "T21 command", as follows:

T21/TRANS:RCV:LBK/LEV/E:F/C:D (12)

The generic instruction executes the T21 primitive command with the following option choices. The first option choice is set to LBK, since the function being provided by the generic instruction is to be done in a loopback mode. The second option, LEV, is set to −13, which directs the remote test system to apply the P/AR signal at a −13 dBm0 level, which is the well-known standard level at which data parameter tests are performed. As with the "meas_tone" generic instruction described above, the direction option (E:F) must be determined by the generic instruction using database 240 to determine the direction (E or F) that corresponds to the A end of the circuit. The last primitive option is called with the D option, which instructs the remote test system to apply default supervision at the test point under test while performing the P/AR test.

UPS interface module 205 shown in FIG. 1 provides a test request interface between interpreter 201 and SARTS core 210 software, and an interface between interpreter 201 and access point database 240. It also provides a command server interface 206, which is used to exchange primitive commands and responses between interpreter 201 and SARTS core software 210.

As mentioned above, a craftsperson may execute a particular user program by entering via terminal T1 an appropriate request command identifying the program and special service circuit that is to be tested. SARTS core software 210 responsive to receipt of the command passes it as data to UPS 205 for storage in a queue maintained by UPS 205. Periodically, the test request interface, using well-known UNIX operating system and C programming language interprocess communication routines, such as msgsnd and msgrcv, unloads the data stored in the queue, if any. UPS interface module 205 then retrieves from database 240 a data record that is stored therein for the special service circuit identified in the received request. The retrieved data record may be used by interpreter 201 in the processing of the instructions forming the user program.

Some of the information contained in the data record is preloaded into a so-called interpreter 201 symbol table in association with predefined variable names, as is done conventionally. This information is thus made available to the user program, e.g., program 220-(N-I), and may include, inter alia, (a) the number and location of test points disposed along the special service circuit, (b) type of RTS at a test point, (c) the type of equipment respectively installed at the end points of the circuit, e.g., loopback device, and (d) the length and resistance associated with any end loops in identified circuit. (This information is required so that the user program may be written in a general way to handle the tests and analysis of tests results. For example, the values of length and resistance of a loop are used by the user program to diagnose loop faults, such as open circuits and short circuits.)

Following the foregoing, UPS 205 calls interpreter 201 and passes thereto the name of the user program that is to be executed. Interpreter 201 then begins the execution of the user program. When interpreter 201 encounters a generic instruction, it "decomposes" it into one or more primitive instructions, as previously described. Command server 206 then supplies the primitive command(s) to core 210, where they are processed in a conventional manner by SARTS 200. Command Server 206 is written in the well-known C programming language and provides an interface between interpreter 201 and core 210 for the purposes of executing the primitive commands. Command server 206 processes primitive commands generated by interpreter 201, and sends them to core 210, using standard UNIX operating system ipc mechanisms. Core 210 in conjunction with the RTS located at the test point being tested then tests the identified special service circuit in the way specified by the primitive commands, for example, by performing a P/AR function. The test or measurement data obtained as a result of the test is then passed back to core 210 and thence to command server 206 using standard UNIX operating system ipc mechanisms. Command server 206 then parses the resulting measurement, if any, using standard UNIX and C parsing routines, such as regex, and then makes that result available to interpreter 201. Interpreter 201 then loads the latter result into the aforementioned interpreter symbol table (not shown), which may be accessed by the user program, e.g., program 220-(N-I) for the purpose of generating output. Such output may include test results or other data as dictated by the design of the user program. Output which is generated by a user program is stored in a results database (not shown), which may be accessed at the end of the test by the craftsperson via terminal T1 for display thereat.

Figure 4:
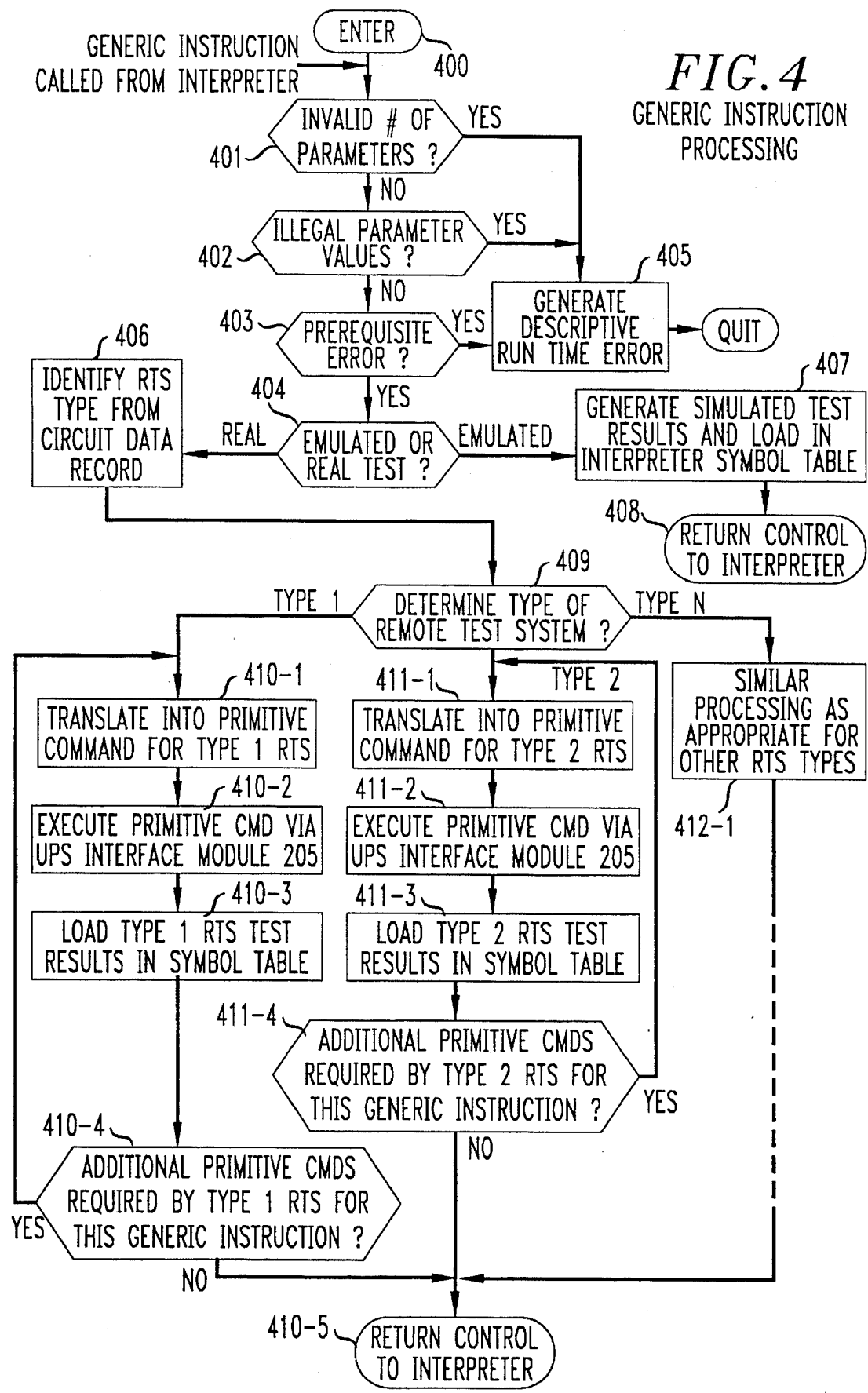
FIG. 4 shows in flow chart form the program which implements the invention in the system of FIG. 1.

FIG. 4 illustrates the program that implements the principles of the invention in interpreter 201. Specifically, when interpreter 201 encounters a generic instruction it enters the program (block 400) to process the instruction. Upon being so entered, the program performs a number of different validity checks on the instruction. For example, the program (block 401) checks to see if the generic instruction contains the correct number of parameters. If yes, then the program (block 402) checks to see if specified parameters are within a valid (acceptable) range of values. If so, then the program (block 403) performs a "prerequisite" check to see if the appropriate test conditions needed to execute the current generic instruction had been previously applied by the user program. For example, if the current generic instruction is, e.g., meas_tone, then the program checks to see if the user program has established access to the circuit that is being tested. If the check done at blocks 401, 402 or 403 fails, then the program (block 405) generates and stores in the results database an error message describing the error condition. The program then exits thereby ending the execution of the user program.

Otherwise, the program checks to see if the user program is "running" under emulated conditions or is in an operational ("live") mode. If the former, then the program (block 407) generates a simulated test result using a conventional table look-up operation and loads the simulated result in the symbol table. The program then returns control to the interpreter. If the latter, then the program uses the associated circuit data record to identify the type of RTS that will perform the test at the associated test point. The program (block 409) then transfers to one of a different number of branches in the program based on the identified RTS type. If the RTS is of the first type, then, in the manner described above, the program at the branch formed by block 410-1 thorough 410-5 (a) generates the required primitive(s), (b) executes the first primitive via interface UPS module 205, (d) loads tests results, if any, into the symbol table, and (e) returns to block 410-1 to process bundled primitives, if any. Otherwise, the program returns control to interpreter 201. If the RTS is of the second type, then, the program similarly processes the generic instruction in the manner described above as represented by the branch formed by blocks 411-1 through 411-4 and block 410-5. The program branch represented by block 412-1, the dashed line and block 410-5 represent similar processing for other types of RTS, e.g., an RTS of type 3.

Figure 5:
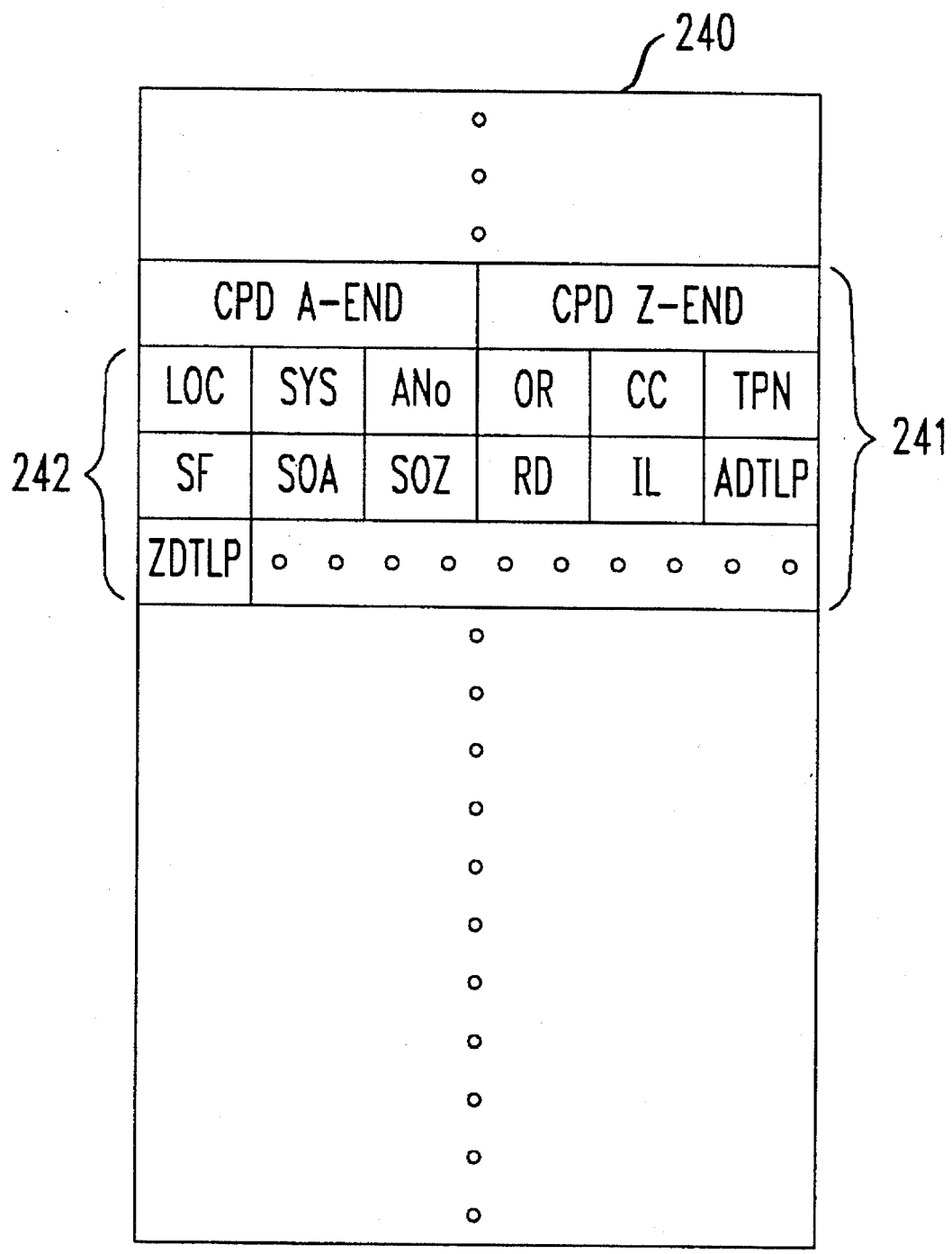
FIG. 5 illustrates a data record for a special service circuit in which the record is stored in the access point database of FIG. 1.

FIG. 5 shows an illustrative layout of a data record 241 for a special service circuit, in which the record is stored in database 240 as mentioned above. Data record 241 includes fields for specifying data specific to a circuit (CPD) including the identification of termination equipment and information related to equipment disposed at the A and Z ends of the circuit. For example, the CPD A-End (Z-End) field identifies the end termination equipment (e.g., loopback device), cable length and resistance of the associated end loop. The remaining portion 242 of record 241 is related to access point data and such data is specified for each of the test points along the associated circuit, in which each such record portion 242 is formed from a plurality of fields, for example, the following fields:

| | |
|---|---|
| Location (LOC) | specifies the CLLI code of the RTS (e.g., building or CO location); |
| System (SYS) | data identifying a single RTS within a location to deal with the situation where a single location may contain multiple RTSs; |
| Access Number (ANo) | is used by the RTS to access the special services circuit; |
| Orientation (OR) | indicates how the test point is wired with respect to the A end and Z end of the circuit; |
| Configuration Code (CC) | specifies whether the test point is a 2 wire or 4 wire test point; |
| Test Point Number (TPN) | specifies the identity of the associated test point. (Note that test points are numbered in increasing order starting at the A end of the circuit;) |
| Signaling Format (SF) | identifies the signaling format (e.g., loop signaling) at the associated test point; |
| Signaling Operation in A direction (SOA) | identifies the signaling operation (e.g., loop start) in the A direction; |
| Signaling Operation in Z direction (SOZ) | same as above but applies to Z direction; |
| Ring Direction (RD) | indicates the applicable direction to apply ringing with respect to the A and Z ends of the circuit. |
| Impedance Level (IL) | identifies the AC impedance at the associated access point as 150, 600, 900, or 1200 ohms; |
| A Direction TLP (ADTLP) | specifies the Transmission Levl Point (TLP) at the associated test point for signals traversing toward the A end of the circuit; and |
| Z Direction TLP (ZSTLP) | same as ADTLP but applies to signals at the Z end of the circuit. |

The foregoing is merely illustrative of the principles of the invention. Those skilled in the art will be able to devise numerous arrangements, which, although not explicitly shown or described herein, nevertheless embody those principles that are within the spirit and scope of the invention.

| Appendix A | |
|---|---|
| "send_tone | Apply a standard test tone to the circuit. |
| "send_any_tone | Apply a test tone of a frequency specified by the user frequency |
| "meas_tone | Measure the level and frequency of the applied tone |
| "meas_noise | Measure the noise on the circuit |
| "split" | Provide a high level on-hook/off-hook |

-continued

Appendix A

| | |
|---|---|
| | condition. (Note that instruction Incorporates a Signaling Format Verification (SFV) macro functionality to correctly determine simplexed signaling types.) |
| "check_lbk" | Determines whether an analog loopback (lbk) device is operated or released. |
| "meas_lpt" | Executes a full set of metallic measurements (Voltage, resistance, capacitance, noise). |
| "meas_vlt" | Executes a single voltage measurement, or a full set (tip-to-ground, ring-to-ground, or ring-to-tip measurements). |
| "meas_cont" | Executes a full set of transmission measurements between a pair of test points on the circuit under test. |
| "dtv" | Executes a dial tone detect/dial tone break test on switched voice services that use dial tone as start dial signal. |
| "meas_lbk" | Executes a full set of analog loopback transmission measurements, including level, level deviation, frequency, and noise. |
| "meas_lbk_par" | Measures the peak-to-average (P/AR) ratio of a test point configured in an analog loopback condition. |
| "analyze" | Analyzes the test results returned from generic test instructions that return measurement values. |
| "cfgntyp", | Determines whether a test point is a 1, 2 or 4 wire test point. |
| "xmt_offset", | Calculates the transmit level offset caused by limited remote test system resolution. |
| "acs" | Provides access to a specified test point and includes automatic retry for a busy (in-use) test point. |
| "acs2" | Provides access to a pair of specified test points, as required to run an interoffice transmission or signaling tests. |
| "rmv_tone" | Removes an applied tone or test signal. |
| "goto_top" | Go to top pseudo test point. |
| "goto_bot" | Go to bottom pseudo test point. |
| "set_retry" | Sets retry parameters (number of retries and interval) for busy test resources not related to access (e.g., busy data parameter enhancements in type 1 RTSs). |
| "set_acs_retry" | Sets retry parameters for "access busy" conditions. |
| "set_pr_reverse" | Set pair reverse option, causing ALL transmission tests to be done on opposite pair, as would be done when checking for "frogged" pairs on the circuit under test. |
| "stub_lpt" | Allows a programmer to simulate metallic measurements during program testing. |
| "load_ap" | Allows a programmer to simulate test points on a circuit. |
| "load_ckt" | Allows a programmer to simulate circuit data, such as end termination equipment, loop resistance, loop length, etc. |
| "ckt_info" | Reads circuit data into a user program. |
| "ap_info" | Reads test point data into a user program. |
| "quit" | Quit a user program |
| "sleep" | "Sleep" for the specified interval. |
| "spec_meas" | Process non-numeric measurements, such as overrange, underrange, etc. |

The invention claimed is:

1. A method of testing a section of a special services circuit disposed in a telecommunications system, said special services circuit having at least one circuit section associated with one of a plurality of different types of remote test systems each arranged so that the associated section may be accessed for the purpose of directing said testing, said method comprising the steps of:

responsive to receipt of a request to test said section, invoking a program designed to perform said test, said program being formed from a sequence of program instructions, at least one of said instructions being a generic instruction, executing each of said instructions in sequence, and responsive to executing said at least one generic instruction, generating a number of primitive commands designed to direct the remote test system associated with said at least one section to perform said testing, in which said number and type of primitive commands that are so generated are determined as a function of the type of said associated one of said remote test systems.

2. The method of claim 1 wherein said step of generating includes the step of generating said number as a function of the circuit configuration of said section.

3. The method of claim 2 wherein said circuit configuration may be either a two-wire or four-wire circuit.

4. The method of claim 1 wherein said number is at least two.

5. The method of claim 1 wherein said number is one.

6. The method of claim 1 further comprising the steps of responsive to testing another section of said special services circuit and to re-executing said generic instruction to test said other section, generating a different primitive command designed to direct a different one of said plurality of different types of remote test systems that is associated with said other section to perform said testing at said other section, in which said the type of said different primitive command is generated as a function of the type of said different one of said remote test systems that is associated with said other section.

7. A method of testing a section of a special services circuit disposed in a telecommunications system, said special services circuit being formed from at least two such sections, said sections being associated with respective types of remote test systems each arranged so that the associated section may be accessed for the purpose of directing said testing, said method comprising the steps of:

executing a sequence of instructions forming a program designed to test said section, said sequence including at least one generic instruction, and responsive to executing said at least one generic instruction, generating at least one primitive command designed to direct the remote test system associated with said section to perform said testing, said primitive command being customized to perform said testing based on the type of remote test system that is associated with said section.

8. The method of claim 7 further comprising the step of further customizing said primitive command based on the circuit configuration of said section.

9. A system for testing a special services circuit comprising:

a program directory for storing a plurality of programs for testing respective ones of a plurality of special services circuit, a software system for responding to a user request to test one of said special services circuit and for interfacing said special services circuit with a particular one of said programs that is designed to test said special services circuit, and an interpreter for executing a sequence of instructions forming said one of said programs such that, responsive to executing a generic instruction, generating at least one primitive command designed to direct a remote test system to perform said testing on an associated section of said special services circuit, said primitive command being customized to perform said testing based on the type of remote test system that is associated with said section.

10. The system of claim 9 further comprising the step of further customizing said primitive command based on the circuit configuration of said section.

* * * * *